US010219240B2

(12) United States Patent
Basavaraj et al.

(10) Patent No.: US 10,219,240 B2
(45) Date of Patent: Feb. 26, 2019

(54) METHOD AND SYSTEM FOR USER EQUIPMENT BEHAVIOR IN MANUAL CSG SELECTION MODE

(71) Applicant: Samsung Electronics Co., Ltd., Suwon-si, Gyeonggi-do (KR)

(72) Inventors: Dandra Prasad Basavaraj, Bangalore (IN); Pavan Kumar Devarayanigari, Bangalore (IN); Jaya Prakash, Bangalore (IN); Nitesh Pushpak Shah, Bangalore (IN); Prakash Rao, Bangalore (IN); Srinivas Chinthalapudi, Bangalore (IN); Vijay Ganesh Surisetty, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 15/026,477

(22) PCT Filed: Apr. 9, 2014

(86) PCT No.: PCT/KR2014/003065
§ 371 (c)(1),
(2) Date: Mar. 31, 2016

(87) PCT Pub. No.: WO2015/050301
PCT Pub. Date: Apr. 9, 2015

(65) Prior Publication Data
US 2016/0242138 A1 Aug. 18, 2016

(30) Foreign Application Priority Data

Oct. 3, 2013 (IN) ............................ 4493/CHE/2013

(51) Int. Cl.
*H04W 48/20* (2009.01)
*H04W 60/04* (2009.01)
(Continued)

(52) U.S. Cl.
CPC ............. *H04W 60/04* (2013.01); *H04W 4/08* (2013.01); *H04W 8/082* (2013.01); *H04W 48/18* (2013.01);
(Continued)

(58) Field of Classification Search
CPC ..... H04W 16/32; H04W 48/16; H04W 48/20; H04W 68/12; H04W 84/045; H04W 68/00
See application file for complete search history.

(56) References Cited

U.S. PATENT DOCUMENTS

2010/0075665 A1 3/2010 Nader et al.
2010/0110987 A1* 5/2010 Subramanian ........ H04W 48/18
370/328

(Continued)

FOREIGN PATENT DOCUMENTS

CN 101707794 A 5/2010
CN 101730199 A 6/2010
(Continued)

OTHER PUBLICATIONS

Chinese Office Action dated Oct. 16, 2018, issued in a counterpart Chinese application No. 201480054796.7.

*Primary Examiner* — Quan M Hua
(74) *Attorney, Agent, or Firm* — Jefferson IP Law, LLP

(57) ABSTRACT

A method and system for enabling a User Equipment (UE) to quickly recover back to normal service on failure of registration attempt to a selected Closed Subscriber Group (CSG) cell or loss of coverage of the selected CSG cell is provided. The method provides a UE behavior during manual CSG selection mode when the selected CSG cell is associated with a different Public Land Mobile Network (PLMN) than the Registered PLMN (RPLMN) of the UE. The method also defines the UE actions to handle a user request to change a current Public Land Mobile Network
(Continued)

(PLMN) selection mode and handle expiry of a Home PLMN (HPLMN) timer in the UE, when the UE is attached to the selected CSG cell in the manual CSG selection mode.

8 Claims, 10 Drawing Sheets

(51) Int. Cl.
*H04W 4/08* (2009.01)
*H04W 8/08* (2009.01)
*H04W 48/18* (2009.01)
*H04W 8/18* (2009.01)
*H04W 84/04* (2009.01)

(52) U.S. Cl.
CPC .............. *H04W 48/20* (2013.01); *H04W 8/18* (2013.01); *H04W 84/045* (2013.01)

(56) References Cited

U.S. PATENT DOCUMENTS

| | | |
|---|---|---|
| 2010/0113020 A1 | 5/2010 | Subramanian et al. |
| 2010/0203865 A1 | 8/2010 | Horn et al. |
| 2011/0256867 A1 | 10/2011 | Wang et al. |
| 2012/0213161 A1 | 8/2012 | Maeda et al. |
| 2012/0218889 A1 | 8/2012 | Watfa et al. |
| 2013/0003699 A1 | 1/2013 | Liu et al. |

FOREIGN PATENT DOCUMENTS

| | | |
|---|---|---|
| CN | 102217382 A | 10/2011 |
| CN | 102308601 A | 1/2012 |
| WO | 2010/062786 A1 | 6/2010 |
| WO | 2012/115995 A1 | 8/2012 |
| WO | 2013/006471 A1 | 1/2013 |

\* cited by examiner

[Fig. 1]
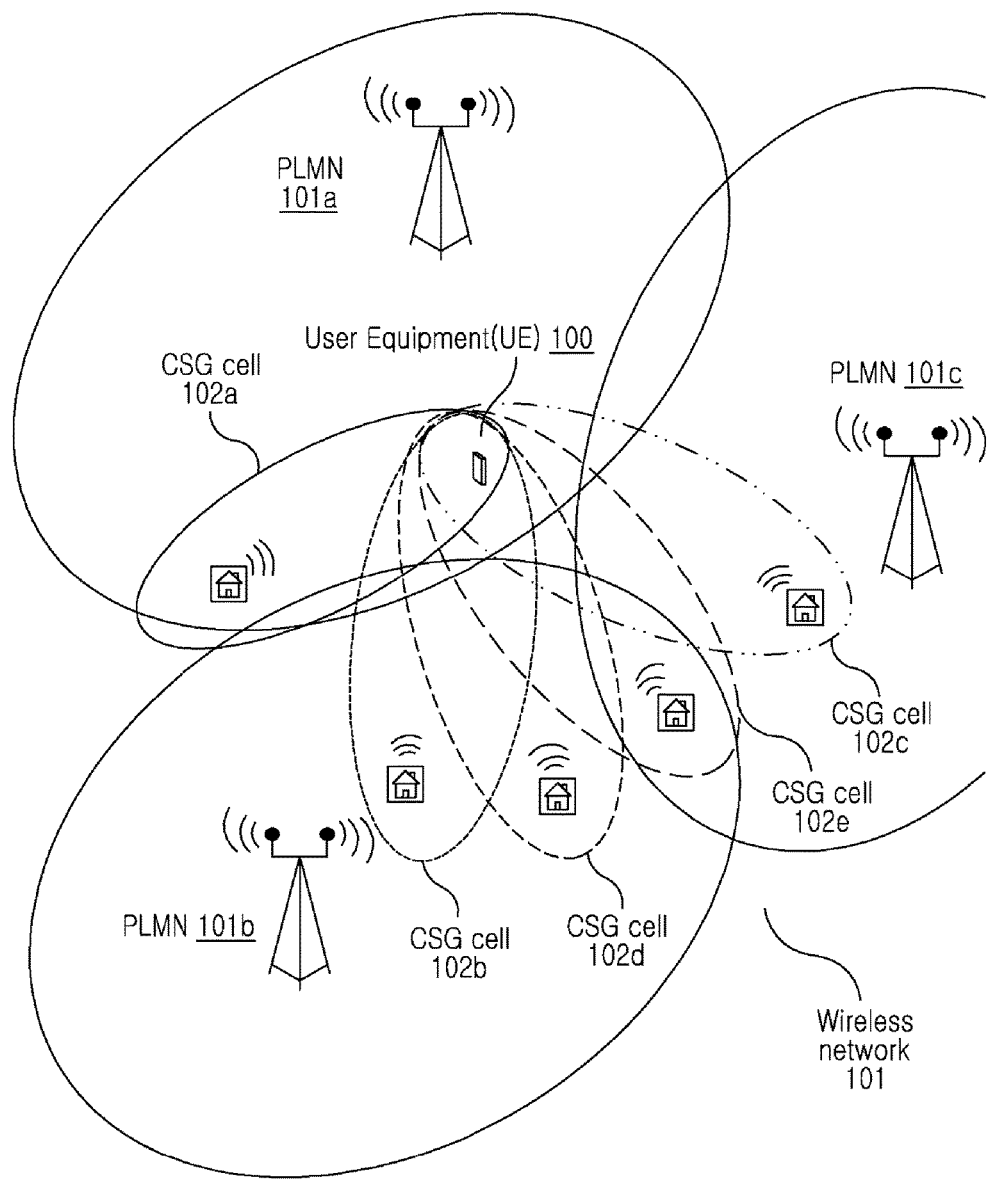

[Fig. 2]
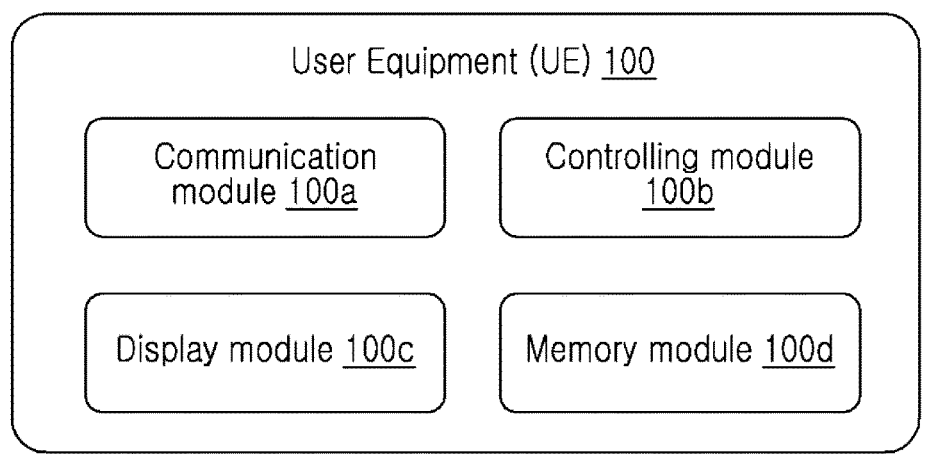

[Fig. 3]
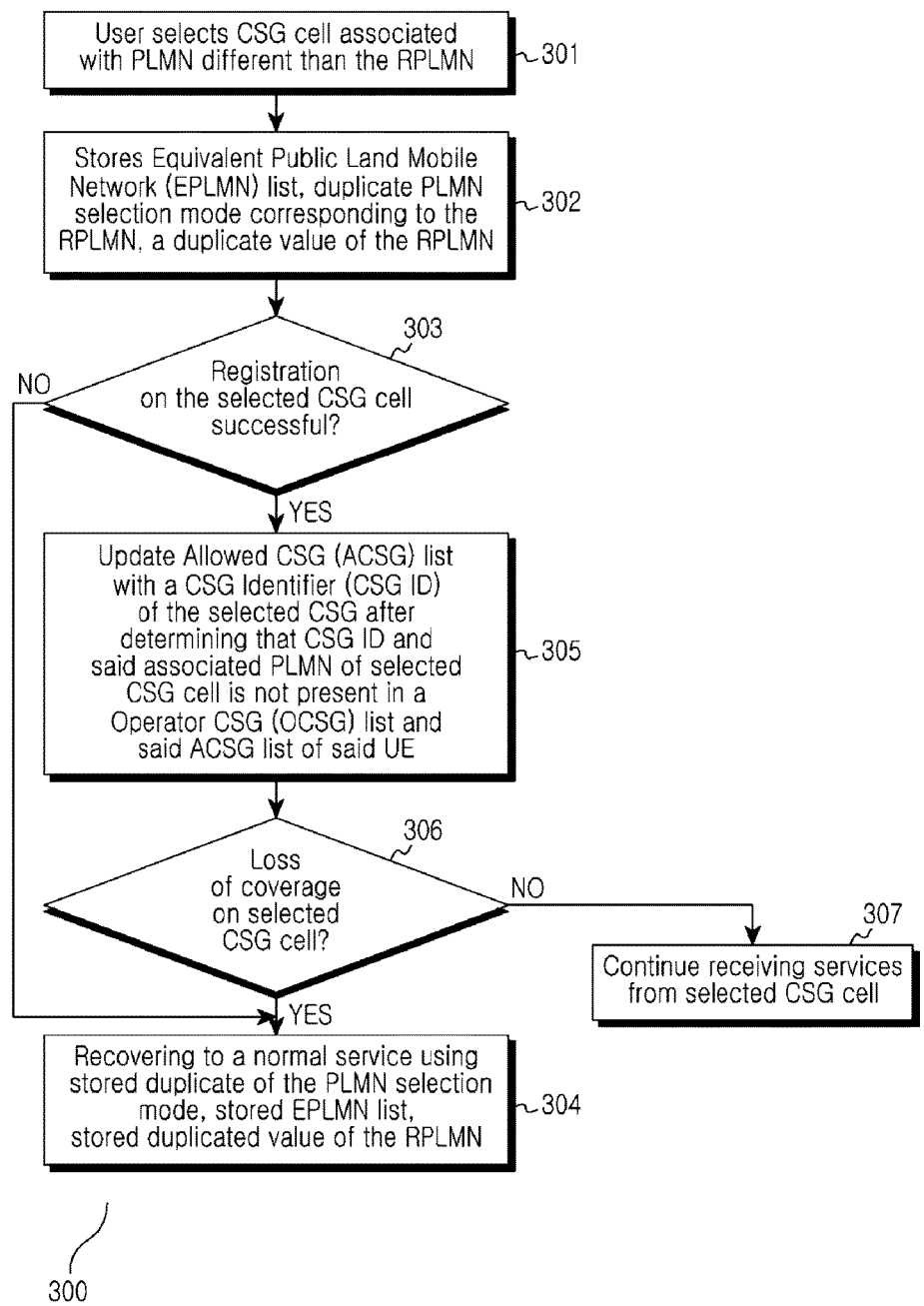

[Fig. 4]
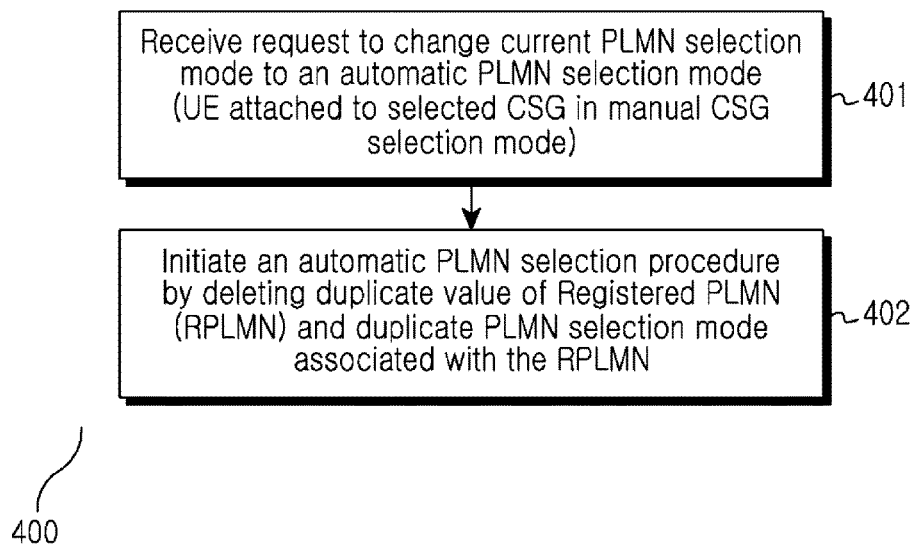

[Fig. 5]
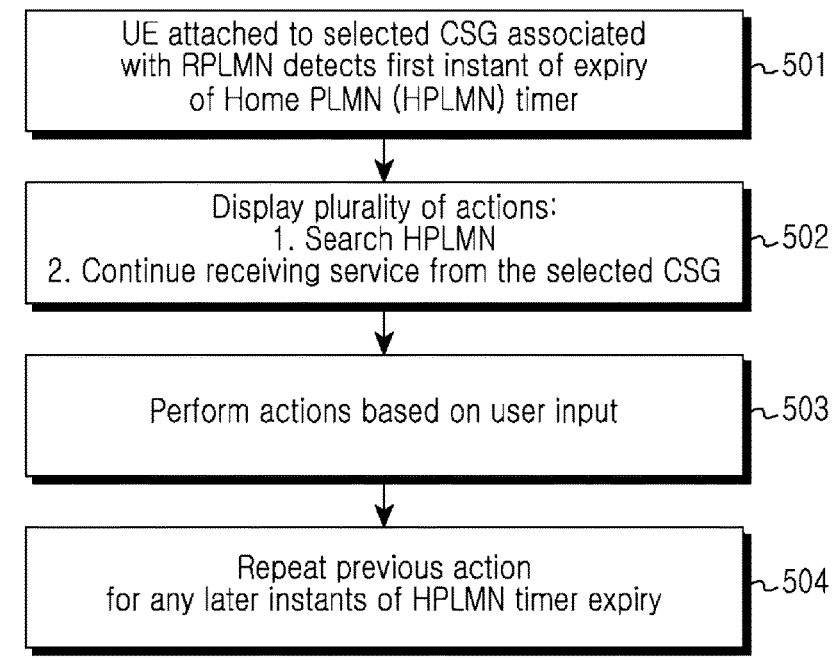

[Fig. 6]
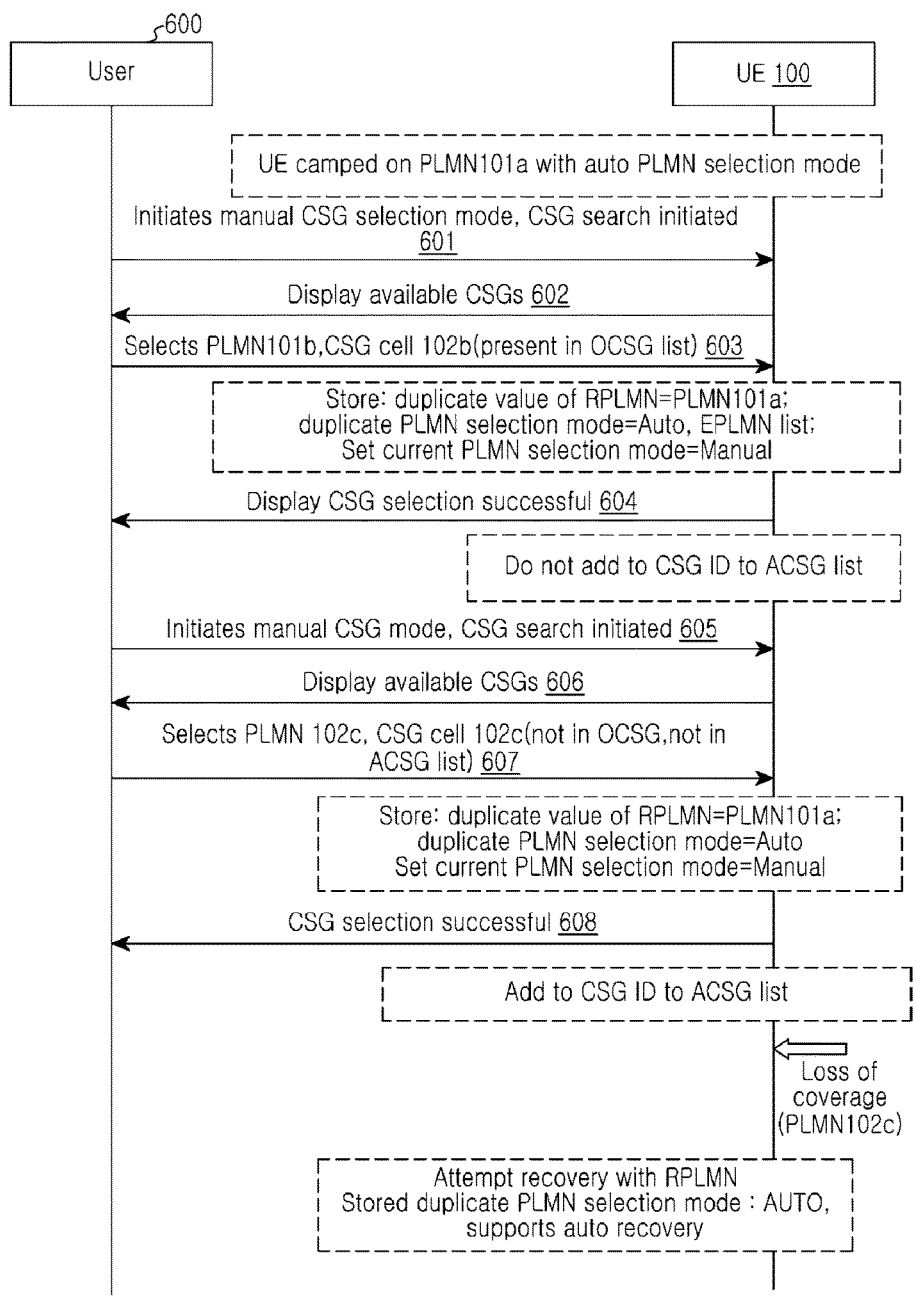

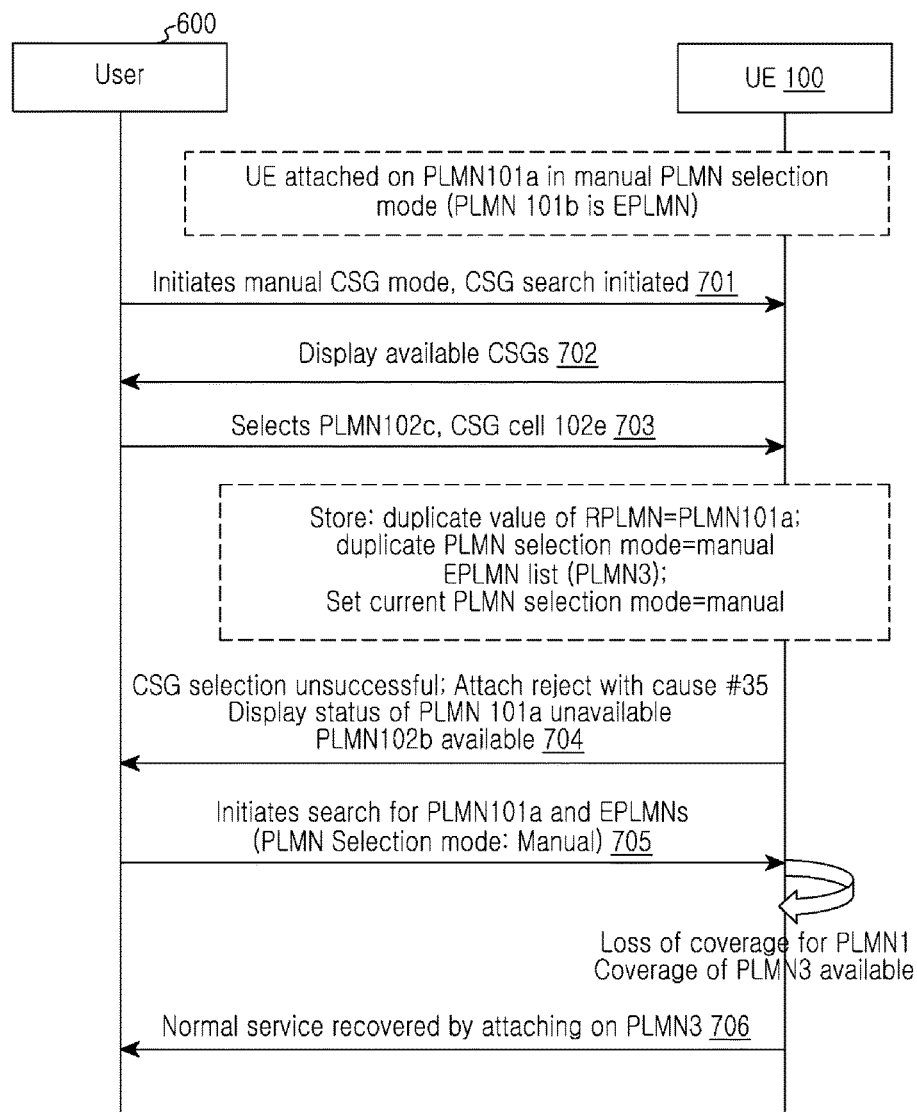
[Fig. 7]

[Fig. 8]
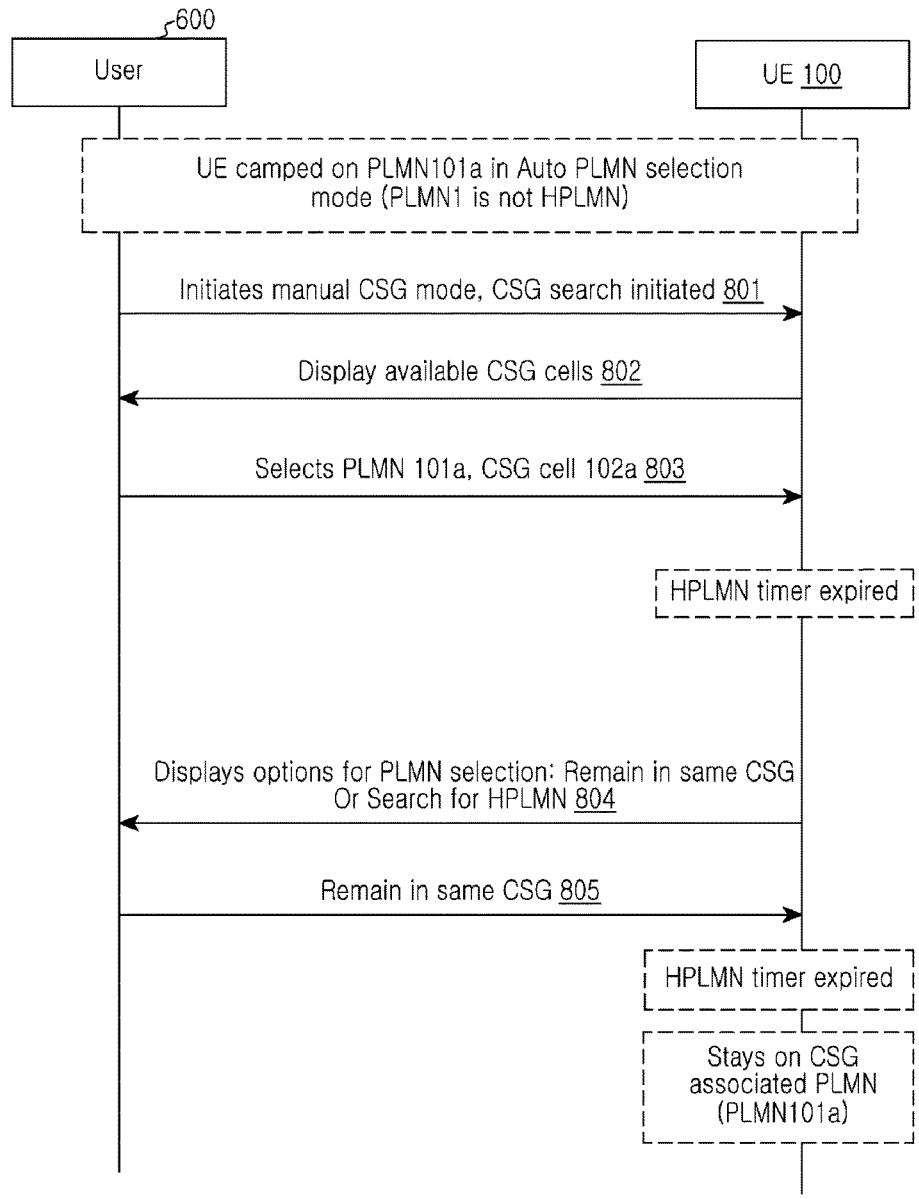

[Fig. 9]
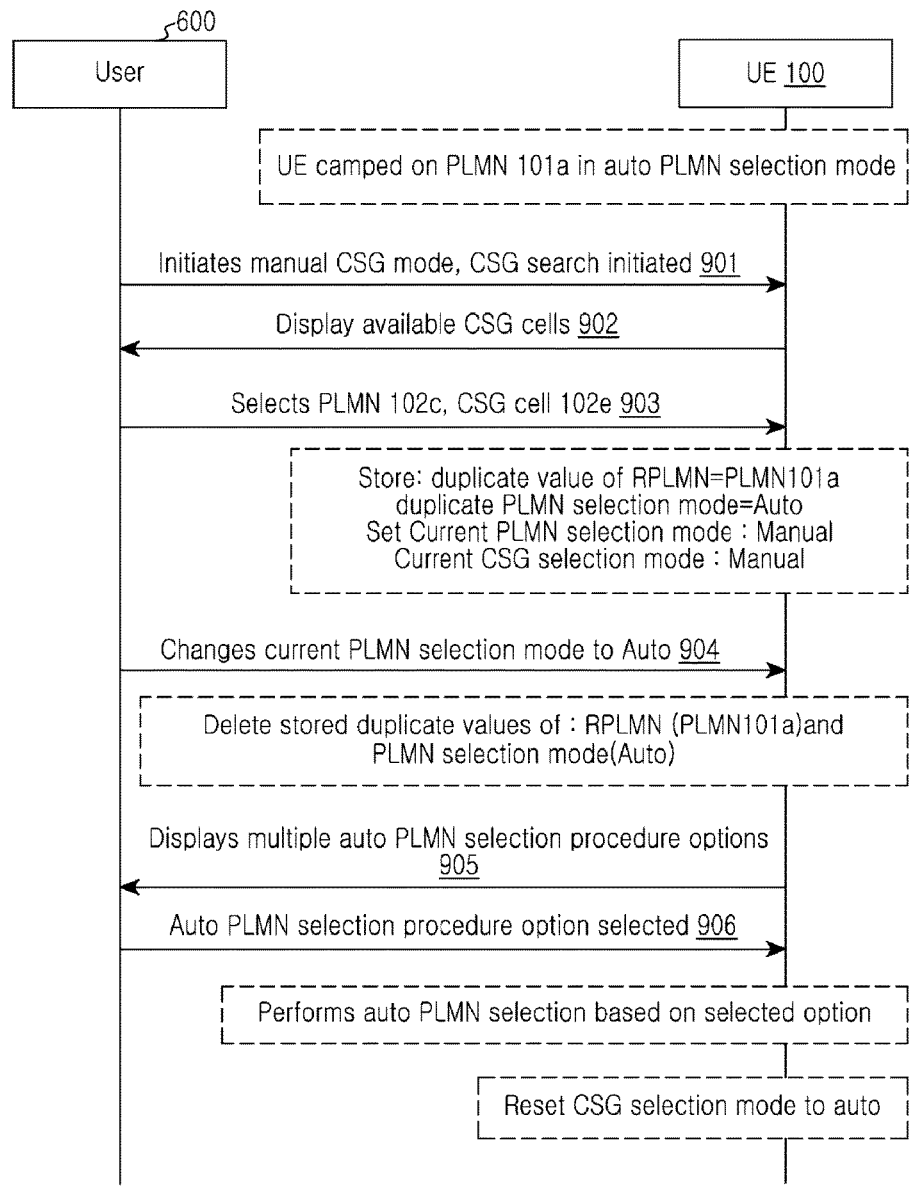

[Fig. 10]
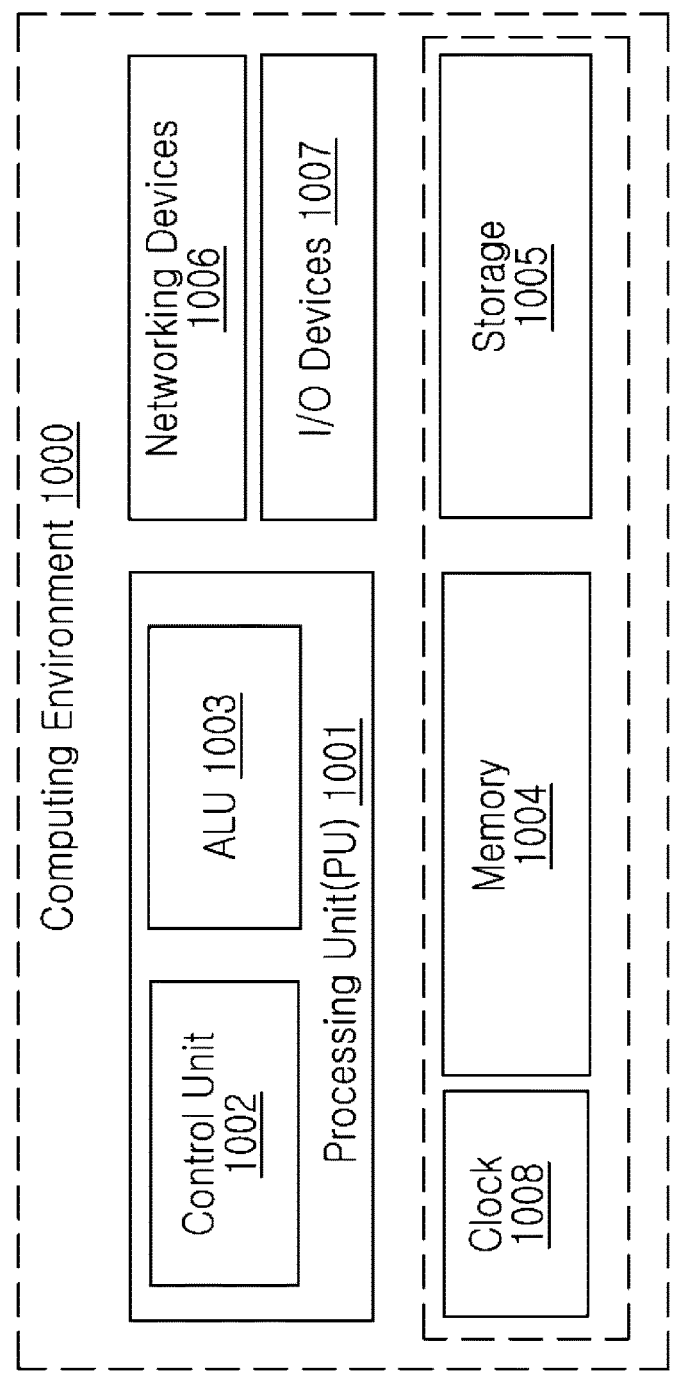

METHOD AND SYSTEM FOR USER EQUIPMENT BEHAVIOR IN MANUAL CSG SELECTION MODE

TECHNICAL FIELD

The embodiments herein relate to Closed Subscriber Group (CSG) cells in a wireless network and more particularly relates to User Equipment (UE) behavior in manual Closed Subscriber Group (CSG) selection mode.

BACKGROUND ART

Mobile traffic demand has been growing substantially in recent years. To meet this growing demand for streaming, gaming, social networking and other multimedia services in parallel with the voice communication, 3GPP formulated Long Term Evolution (LTE) providing enhanced user experience. The LTE technology enables deployment of femtocells also called Home Evolved Node Bs (HeNBs) delivering low power, high-performance access to a user. Usually deployed in homes and businesses, a femtocell can cover hotspots. The user receiving mobile services from a network operator can switch his/her User Equipment (UE) to any of these available femtocells in the vicinity. The UE's access to the femtocell can be restricted through formation of a Closed Subscriber Group (CSG), where each femtocell providing restricted access is member of one or more CSG cells. The UE identifies allowed CSG cells using CSG Identifiers (IDs) specified in the UE's Operator CSG (OCSG) list and Allowed CSG (ACSG) list provided in a Universal Subscriber Identity Module (USIM). The UE selects a CSG cell either using automatic CSG selection mode or manual CSG selection mode. The manual selection mode is a popular choice for the CSG cell selection whenever user desires to choose a CSG cell based on his/her current requirements. Thus the mobile traffic growth, driven by new services and UE capabilities, is paralleled by user expectations. The network operators aim to provide best possible connectivity to the user while user moves through heterogeneous network comprising macro cells, pico cells and femtocells.

While in manual CSG selection mode the UE may switch in and out of the CSG cell, hop between the CSG cells within and outside UE's Registered Public Land Mobile Network (RPLMN). Whenever the UE leaves the currently registered CSG cell, the UE may find itself in coverage area of one or more PLMN operators such as UE's Home Operator (Home Public Mobile Network (HPLMN)), other network operators including Visitors PLMN (VPLMN) and Equivalent PLMN (EPLMN). The RPLMN is the PLMN on which the UE has performed a location registration successfully. The HPLMN is the PLMN in which the UE holds its subscription. The EPLMNs contained in the list of equivalent PLMNs in the UE are PLMNs that are considered equivalent to the HPLMN for PLMN selection, cell selection, cell re-selection and handover. The VPLMN is PLMN that generally offers only limited services such as emergency call only to the UE, except in certain cases such as roaming services if activated by the UE. To provide enhanced user experience during the manual CSG selection mode the UE should be able to recover back to the normal service at earliest in case registration attempt to the CSG cell fails or UE experiences loss of CSG coverage.

In accordance with existing methods defined in current 3GPP specification for the UE behavior in CSG manual selection mode, the UE scans available CSG cells and displays them to the user based on configuration by the HPLMN on a Universal Integrated Circuit Card (UICC). Upon manual selection of the CSG cell by the user, the UE behavior is differentiated based on whether a selected CSG cell belongs to the UE's RPLMN or not. If the PLMN of the selected CSG cell is different than the currently registered PLMN, then the UE saves PLMN selection mode associated with the RPLMN and duplicates value of RPLMN into a non-volatile memory. For any further hops to different CSG associated with other PLMNs, the UE retains the saved duplicate value of RPLMN, however, updates the stored PLMN selection mode in accordance with the most recent PLMN selection mode. Upon, loss of coverage on the user selected CSG cell, the UE changes the current PLMN selection mode to the stored duplicate PLMN selection mode and attempts normal service recovery with the stored duplicate value of RPLMN. In a scenario where the UE in the RPLMN with automatic PLMN selection mode hops across multiple CSG cells before attempting to recover normal service as result of loss of CSG cell coverage, detects the stored duplicate PLMN selection mode to be manual. Thus, updating of PLMN selection mode during every hop from one CSG cell to another in manual CSG selection mode changes the stored PLMN selection mode to manual. This prevents the UE to automatically recover to the normal service on using the stored duplicate value of RPLMN and requires user intervention to select the PLMN manually. This delay may force the UE to enter limited service area of the wireless network.

In another scenario, when the UE in manual PLMN selection mode receives a attach reject with any reject cause such as reject cause #35 (indicating the UE to delete the EPLMN list) during attempt of registration on the selected CSG cell, the UE deletes the stored EPLMN list. This creates an issue while the UE attempts to recover to normal service on loss of coverage of the selected CSG cell as well as loss of coverage of the RPLMN. Thus, with no EPLMN list the UE is forced into limited service even though coverage from an EPLMN is available.

Moreover, the current 3GPP specification does not define actions to be taken by the UE after a HPLMN timer expiry when the UE is in manual CSG selection mode registered with the selected CSG cell associated with the RPLM and is in automatic PLMN selection mode. The existing 3GPP specification also does not state the UE behavior when the user changes the PLMN Selection mode to automatic when CSG selection mode is manual.

In the existing method the UE behavior is defined to update ACSG list whenever registration on the selected CSG cell in manual CSG selection mode is successful. However, irrespective of whether the CSG ID of the registered CSG cell exists in the OCSG list the current 3GPP specification duplicates the CSG ID in the ACSG list. This reduces number of valid CSG ID entries possible in the UE's ACSG list.

The principal object of the embodiments herein is to provide a method and system enabling a User Equipment (UE) to quickly recover back to normal service on failure of registration attempt to a selected Closed Subscriber Group (CSG) or on experiencing loss of coverage of the selected CSG cell when the UE is in a manual CSG selection mode and the selected CSG cell is associated with a different Public Land Mobile Network (PLMN) than the Registered PLMN (RPLMN) of the UE.

Another object of the embodiments herein is to provide a method for handling request to change a current Public Land Mobile Network (PLMN) selection mode in the UE, when the UE is attached to the selected CSG cell in the manual CSG selection mode.

Another object of the embodiments herein is to provide a method for handling expiry of a Home PLMN (HPLMN) timer in the UE in the manual CSG selection mode, when the UE is attached to the selected CSG cell associated with the RPLMN of the UE and the RPLMN of the UE is different from the HPLMN of the UE.

DISCLOSURE OF INVENTION

Solution to Problem

Accordingly the invention provides a method for attempting to register a User Equipment (UE) to a Closed Subscriber Group (CSG) cell in a wireless network, when the UE supports a manual CSG selection. Further, the method comprises storing an Equivalent Public Land Mobile Network (EPLMN) list, a duplicate PLMN selection mode corresponding to a Registered PLMN (RPLMN) of the UE, and a duplicate value of the RPLMN by the UE when the UE attempts to register on a selected CSG cell in a manual CSG selection mode. Further, the selected CSG cell is associated with a Public Land Mobile Network (PLMN) different from the RPLMN. Furthermore, the method comprises recovering a normal service with one of: the RPLMN and an EPLMN from the EPLMN list using: the stored duplicate of the PLMN selection mode and one of: the stored EPLMN list, the stored duplicate value of the RPLMN by the UE when registration on the selected CSG cell is unsuccessful.

Accordingly the invention provides a method for changing a current Public Land Mobile Network (PLMN) selection mode in a User Equipment (UE), when the UE is attached to a selected Closed Subscriber Group (CSG) cell in a manual CSG selection mode. Further the method comprises initiating an automatic PLMN selection procedure by the UE after deleting a duplicate value of Registered PLMN (RPLMN) stored by the UE and a duplicate PLMN selection mode associated with the RPLMN stored by the UE, when the UE receives a request to change the current PLMN selection mode to an automatic PLMN selection mode. Further, the selected CSG cell is associated with a PLMN different than the RPLMN.

Accordingly the invention provides a method for handling expiry of a Home PLMN (HPLMN) timer in a User Equipment (UE). The UE is attached to a selected Closed Subscriber Group (CSG) cell in a manual CSG selection mode. Further, the method comprises handling a first instance of expiry of the Home PLMN (HPLMN) timer in an automatic PLMN selection mode of the UE by continuing receiving service from a Public Land Mobile Network (PLMN) different from a Home PLMN (HPLMN) of the UE. Furthermore, the HPLMN timer is initiated in the UE when the RPLMN is different than the HPLMN and the selected CSG cell is associated with the RPLMN. Further, the method handles the HPLMN timer expiry based on a user selection.

Accordingly the invention provides a User Equipment (UE) to attempt registration to a Closed Subscriber Group (CSG) cell, when the UE supports a manual CSG selection. Further the UE comprises a controlling module. The UE comprises an integrated circuit. Further the integrated circuit comprises at least one processor and at least one memory. The memory comprises a computer program code within the circuit. Further, the integrated circuit comprising at least one memory and the computer program code configured to with the at least one processor enabled with wireless network connectivity cause the controlling module to store a Equivalent Public Land Mobile Network (EPLMN) list, a duplicate PLMN selection mode corresponding to a Registered PLMN (RPLMN) of the UE, and a duplicate value of the RPLMN by the UE when the UE attempts to register on a selected CSG cell in a manual CSG selection mode. Further the selected CSG cell is associated with a Public Land Mobile Network (PLMN) different from the RPLMN. Thereafter the UE is configured to recover to a normal service with one of: the RPLMN and an EPLMN from the EPLMN list using: the stored duplicate of the PLMN selection mode and one of: the stored EPLMN list, the stored duplicate value of the RPLMN, when registration on the selected CSG cell is unsuccessful.

Accordingly the invention provides a User Equipment (UE) to change a current Public Land Mobile Network (PLMN) selection mode of the UE, when the UE is attached to a selected Closed Subscriber Group (CSG) cell in a manual CSG selection mode. Further the UE comprises a controlling module. The UE comprises an integrated circuit. Further the integrated circuit comprises at least one processor and at least one memory. Further, the integrated circuit comprising at least one memory and the computer program code configured to with the at least one processor enabled with wireless network connectivity cause the controlling module to initiate an automatic PLMN selection procedure after deleting a duplicate value of Registered PLMN (RPLMN) stored in the UE and a duplicate PLMN selection mode associated with the RPLMN stored in the UE, when the controlling module receives a request to change the current PLMN selection mode to an automatic PLMN selection mode. Further, the selected CSG cell is associated with a PLMN different than the RPLMN.

Accordingly the invention provides a User Equipment (UE) to handle expiry of a Home PLMN (HPLMN) timer in the UE, when the UE is attached to a selected Closed Subscriber Group (CSG) cell in a manual CSG selection mode. Further the UE comprises a controlling module. The UE comprises an integrated circuit. Further the integrated circuit comprises at least one processor and at least one memory. Further, the integrated circuit comprising at least one memory and the computer program code configured to with the at least one processor enabled with wireless network connectivity cause the controlling module to handle a first instance of expiry of the Home PLMN (HPLMN) timer in an automatic PLMN selection mode of the UE by continuing receiving service from a Public Land Mobile Network (PLMN) different from a Home PLMN (HPLMN) of the UE. Further, the HPLMN timer is initiated in the UE when the RPLMN is different than the HPLMN and the selected CSG cell is associated with the RPLMN. Further the UE is configured to handle the HPLMN timer expiry based on a user selection.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments herein are illustrated in the accompanying drawings, throughout which like reference letters indicate corresponding parts in the various figures. The embodiments herein will be better understood from the following description with reference to the drawings, in which:

FIG. 1 illustrates broad overview of a wireless network environment with a User Equipment (UE) within coverage area of one or more Closed subscriber Groups (CSGs) cells associated with one or more Public Land Mobile Networks (PLMNs) when the UE is in a manual CSG selection mode, according to embodiments as disclosed herein;

FIG. 2 illustrates various modules present in the UE, according to embodiments as disclosed herein;

FIG. 3 illustrates a flow diagram explaining method for a UE behavior during attempt of registration on a selected CSG cell associated with a different PLMN than the Registered (RPLMN) of the UE in the manual CSG selection mode, according to embodiments as disclosed herein;

FIG. 4 illustrates a flow diagram explaining method for handling request to change a current PLMN selection mode to an automatic PLMN selection mode by the UE attached to the selected CSG cell in the manual CSG selection mode;

FIG. 5 illustrates a flow diagram explaining method 500 for handling a Home PLMN (HPLMN) timer expiry by the UE attached to the selected CSG cell associated with the RPLMN of the UE when the RPLMN of the UE is different from the HPLMN of the UE in the manual CSG selection mode, according to embodiments as disclosed herein;

FIG. 6 illustrates an example sequence diagram for scenario 1 when registration attempt of the UE on the selected CSG cell associated with the different PLMN than the RPLMN of the UE is unsuccessful in the manual CSG selection mode, according to embodiments as disclosed herein;

FIG. 7 illustrates an example sequence diagram for scenario 2 when the UE, attached to the selected CSG cell associated with the different PLMN than the RPLMN of the UE, suffers loss of coverage of the selected CSG cell when the UE is in the manual CSG selection mode, according to embodiments as disclosed herein;

FIG. 8 illustrates an example sequence diagram for scenario 3 when the UE attached to the selected CSG cell in the manual CSG selection mode receives request to change the current PLMN selection mode to the automatic PLMN selection mode, according to embodiments as disclosed herein;

FIG. 9 illustrates an example sequence diagram for scenario 4 for handling expiry of the Home PLMN (HPLMN) timer in the manual CSG selection mode, when UE is attached to the selected CSG cell associated with RPLMN of the UE which is different from the HPLMN of the UE, according to embodiments as disclosed herein; and FIG. 10 illustrates a computing environment implementing the method and system for the UE behavior in manual CSG selection mode, according to embodiments as disclosed herein.

BEST MODE FOR CARRYING OUT THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for attempting to register a User Equipment (UE) to a Closed Subscriber Group (CSG) associated with a different Public Land Mobile Network (PLMN) than the Registered PLMN (RPLMN) of the UE, when the UE supports manual CSG selection. Unlike the existing methods that store only a RPLMN value and current PLMN selection mode of the of the UE, the method enables the UE to store an Equivalent Public Land Mobile Network (EPLMN) list and a duplicate PLMN selection mode corresponding to the Registered PLMN (RPLMN) along with the duplicate value of the RPLMN before attempting for the registration on the selected CSG cell.

Whenever the registration attempt on the selected CSG cell is unsuccessful or the UE experiences loss of coverage after registering successfully on the selected CSG cell, the method enables the UE to quickly recover to normal service. The method enables the UE to use the stored duplicate of the PLMN selection mode, the stored EPLMN list and the stored duplicate value of the RPLMN to quickly recover to normal service.

On successful registration on the selected CSG cell, the method enables the UE to update an Allowed CSG (ACSG) list in the UE if the CSG ID of the selected CSG cell is not present in either of an Operator CSG (OCSG) list and the ACSG list of the UE. Unlike the existing methods, which update the ACSG list by comparing CSG ID of the selected CSG cell only with the ACSG list in the UE, the proposed methods enables the UE to avoid duplicate entries onto ACSG list in case the CSG ID is already present in the UE's OCSG list. This increases the number of valid entries of ACSG list that are maintained in a Universal Subscriber Identity Module (USIM) of the UE and decreases the frequency of request for ACSG list update from the PLMN operator.

The method enables the UE attached to the selected CSG cell in manual CSG selection mode to handle a request received for changing a current Public Land Mobile Network (PLMN) of the UE to an automatic PLMN selection mode. The method enables the UE to respond to the request by displaying multiple options to the user for initiating one or more automatic PLMN search procedures.

The method enables the UE attached to the selected CSG cell in manual CSG selection mode to handle expiry of a Home PLMN (HPLMN) timer by providing the user to select one of the displayed actions to be performed on expiry of the HPLMN timer.

The method describes a plurality of situations the UE experiences in the manual CSG selection mode using multiple use case scenarios and explains the UE behavior in those respective situations. The use case scenarios are provided for better understanding of the proposed method and are not a limitation.

In an embodiment, the UE can be a mobile phone, a tablet, a Personal Digital Assistant (PDA), a laptop, a palm top or any other communication device capable of supporting manual CSG selection mode.

In an embodiment, the wireless network is network including UMTS Terrestrial Radio Access (UTRA) services and evolved UMTS Terrestrial Radio Access (EUTRA) services provided by a plurality of PLMN operators that support deployment of CSG cells.

Referring now to the drawings, and more particularly to FIGS. 1 through 10, where similar reference characters denote corresponding features consistently throughout the figures, there are shown preferred embodiments.

FIG. 1 illustrates broad overview of the wireless network environment with the UE within coverage area of one or more Closed subscriber Groups (CSGs) cells associated with one or more Public Land Mobile Networks (PLMNs) when the UE is in a manual CSG selection mode, according to embodiments as disclosed herein. The figure depicts a User Equipment (UE) 100 in a wireless network 101. The wireless network 101 includes a plurality of PLMNs provided by a plurality of network operators (PLMN operators). For simplicity of understanding, the figure depicts only PLMN 101*a*, PLMN 101*b* and PLMN 101*c*. Each of the PLMN 101*a*, 101*b* and 101*c* respectively provides CSG services by deploying one or more CSG cells such as CSG cell 102*a* associated with PLMN 101*a*, CSG cell 102*b* and 102*d* associated with PLMN 101*b* and CSG cell 102*c* and 102*e* associated with PLMN 101*c*. The UE 100, which supports manual CSG selection mode, receives coverage of one or more CSG cells. For example, if the PLMN 101*a* is the RPLMN of the UE 100*a*, the PLMN 101*b* can be the EPLMN of the UE if the UE's EPLMN list includes PLMN 101*b*. The PLMN 102*c* can be any other PLMN such as a Visiting PLMN (VPLMN) of the UE.

In most of the situations the UE moves within its HPLMN coverage and hence is registered with its own HPLMN. In such case the UE 100 is associated with the RPLMN which is also its HPLMN. However, this need not be the case always and UE 100 may be registered to the PLMN which is not its HPLMN.

The method enables the UE to store the EPLMN list and the duplicate PLMN selection mode corresponding to the RPLMN along with the duplicate value of the RPLMN before attempting for the registration on the any of the selected CSG cell such as CSG cell 102*b*, 102*c*, 102*d* and 102*e* respectively in manual CSG selection mode, when the selected CSG cell is not associated with the RPLMN of the UE 100.

The method provides the UE behavior for handling registration failure and loss of coverage on the selected CSG cell. The method also provides the UE behavior for updating the ACSG list, handling the HPLMN timer expiry and handling request for change of the PLMN selection mode when the UE is in manual CSG selection mode. The UE behavior is further explained in details in FIG. 3, FIG. 4 and FIG. 5

The wireless network 101 depicted in the figure includes the UE 100 for illustrative purpose, however the wireless network 101 includes one or more UEs implementing the behavior as proposed by the method during the manual CSG selection mode.

FIG. 2 illustrates various modules present in the UE, according to embodiments as disclosed herein. The figure depicts UE 100 with communication module 100*a*, controlling module 100*b*, display module 100*c* and memory module 100*d*. The communication module is configured to communicate with the PLMNs such as PLMN 101*a*, 101*b* and 101*c* respectively and the CSG cells 102*a*, 102*b*, 102*c*, 102*d* and 102*e* respectively when the UE 100 moves through the wireless network 101. The controlling module 100*b* is configured to handle manual CSG selection mode as proposed by the method disclosed. The controlling module 100*b* is configured to send list of available CSG cells to the display module 100*c*, which then is configured to display the CSG list to the user through a User Interface (UI). The various options to perform various manual CSG selection procedures based on user input as proposed by the method are also displayed to the user on the UI. The controlling module 100*b* is configured to receive user inputs such as user selected CSG, user selected automatic PLMN search option and similar user inputs required during the manual CSG selection mode of the UE 100. The controlling module 100*b* is configured to store an Equivalent Public Land Mobile Network (EPLMN) list, the duplicate PLMN selection mode corresponding to the Registered PLMN (RPLMN) and the duplicate value of the RPLMN in the memory module 100*d* before attempting for the registration on the selected CSG cell associated with the PLMN different from the RPLMN. The controlling module is also configured to handle HPLMN timer expiry along with various other functions for CSG manual CSG selection mode.

FIG. 3 illustrates a flow diagram explaining method 300 for the UE behavior during attempt of registration on the selected CSG cell associated with the different PLMN than the Registered (RPLMN) of the UE in the manual CSG selection mode, according to embodiments as disclosed herein. As depicted in the flow diagram, at step 301, the user selects the CSG cell associated with the PLMN different than the RPLMN of the UE 100. At step 302, the UE 100 stores the EPLMN list present in the UE 100, stores the duplicate PLMN selection mode corresponding to the RPLMN and stores the duplicate value of the RPLMN in the memory module 100*d*. Thereafter, at step 303, the UE 100 checks whether the registration attempt on the selected CSG cell is successful. If the registration attempt is unsuccessful, the UE 100 tries to recover to the normal service using the stored duplicate of the PLMN selection mode, the stored EPLMN list, the stored duplicate value of the RPLMN. Thus UE 100 recovers to normal service on either of available RPLMN or any EPLMN present in the stored EPLMN list.

Unlike existing methods that fail to enable the UE recover to normal service on EPLMN when the EPLMN list in the UE is deleted on reception of attach failure message including a reject cause such as reject cause #35 (indicating the UE to delete the EPLMN list), the stored EPLMN list provided by the method is available with the UE. The UE 100 can recover to normal service using the stored EPLMN list even if the UE 100 deletes EPLMN list in response to attach failure message carrying the reject cause.

At step 303, if the attempt of registration to the selected CSG cell is successful, then at step 305, the UE 100 updates the ACSG list with the CSG ID of the selected CSG cell after determining that CSG ID and the associated PLMN of selected CSG cell is not present in either of the OCSG list or the ACSG list of the UE 100. This avoids duplicating any entries of CSG IDs that are already present in the OCSG list. However, at step 306, if UE 100 is within the coverage of the selected CSG cell, then at step 307, the UE 100 continues receiving services from the selected CSG cell. Further, at step 306, if the UE 100 suffers loss of coverage of the selected CSG cell, the UE 100 tries to recover to the normal service using the stored duplicate of the PLMN selection mode, the stored EPLMN list, the stored duplicate value of the RPLMN as described earlier. The various actions, acts, blocks, steps, and the like in method 300 may be performed in the order presented, in a different order or simultaneously. Further, in some embodiments, some actions, acts, blocks, steps, and the like may be omitted, added, modified, skipped, and the like without departing from the scope of the invention.

FIG. 4 illustrates the flow diagram explaining method 400 for handling request to change the current PLMN selection mode to the automatic PLMN selection mode by the UE attached to the selected CSG cell in the manual CSG selection mode. As depicted in the flow diagram, at step 401, the UE 100 attached to the selected CSG in manual CSG selection mode receives request to change current PLMN selection mode to the automatic PLMN selection mode. However, as the CSG selection mode is manual, the current PLMN selection mode of the UE 100 is manual. Unlike existing methods defined by 3GPP specification that do not define the UE actions in such situation, the method proposed allows the UE 100 to change the current PLMN selection mode to automatic PLMN selection mode. Further, at step 402, the UE 100 initiates an automatic PLMN selection procedure by deleting stored duplicate value of Registered PLMN (RPLMN) and stored duplicate PLMN selection mode associated with the RPLMN. The method enables the UE 100 to display multiple automatic PLMN selection procedure and further perform automatic PLMN selection procedure based on user selection.

The multiple options provided to the user for initiating the automatic PLMN selection procedure include but are not limited to initiating the PLMN search from the RPLMN of the UE 100, initiating the PLMN search from the HPLMN of the UE 100 continue receiving service from the PLMN associated with the selected CSG associated with the PLMN different that the RPLMN of the UE 100.

In an embodiment, if the user does not respond within a predefined time, the UE 100 can switch to a default automatic PLMN selection procedure.

Allowing the UE 100 to switch to automatic PLMN selection mode when the UE 100 is in manual CSG selection mode creates contradictory situation. The reason being, whenever the CSG selection mode is manual and the selected CSG is associated with the PLMN different than the RPLMN of the UE 100, the current PLMN selection mode has to be set to manual. To avoid this contradiction, method proposed allows the UE 100 to automatically reset the CSG selection mode to automatic CSG selection mode. The various actions, acts, blocks, steps, and the like in method 400 may be performed in the order presented, in a different order or simultaneously. Further, in some embodiments, some actions, acts, blocks, steps, and the like may be omitted, added, modified, skipped, and the like without departing from the scope of the invention.

FIG. 5 is the flow diagram explaining method 500 for handling the Home PLMN (HPLMN) timer expiry by the UE attached to the selected CSG cell associated with the RPLMN of the UE when the RPLMN of the UE is different from the HPLMN of the UE in the manual CSG selection mode, according to embodiments as disclosed herein.

In accordance with the 3GPP standards, whenever the selected CSG is associated with the RPLMN, then, irrespective of the CSG selection mode the current PLMN selection mode of the UE is set to automatic.

Any UE automatically initiates the HPLMN timer when out of coverage of its own HPLMN and tries to search the HPLMN on expiry of the timer. However the actions for HPLMN timer expiry, when UE is in manual CSG selection are not defined by the existing 3GPP specifications.

As depicted in the flow diagram, at step 501, the UE attached to the selected CSG associated with RPLMN detects first instant of expiry of Home PLMN (HPLMN) timer. The method proposed defines actions to be followed by UE 100 for every HPLMN timer expiry. At step, 502 the UE 100 to displays multiple options to the user for selecting an action based on which the UE 100 responds to the HPLMN timer expiry. This enables the user to select the action which includes but is not limited to searching the HPLMN or continue receiving service from the PLMN associated with the selected CSG.

Further, at step 503, the UE 100 responds to the HPLMN timer expiry by performing action based on the user input.

In an embodiment, if the UE 100 does not receive a user response within a predefined time interval, the UE 100 performs a preset HPLMN timer expiry action.

In an embodiment, the choices provided to the user for HPLMN timer expiry actions include but are not limited to switching to services provided by an available High priority PLMN.

The UE 100 records the user selection, and uses it for responding to the HPLMN timer expiry at any later instant. Further, at step 504, the UE 100 repeats the recorded action for any later instants of HPLMN timer expiry and does not require the user input to be provided for any later instants of HPLMN timer expiry.

In an embodiment, after a preset threshold time expires, the UE 100 can notify the user to re-enter the user selection for actions to be performed after HPLNM timer expiry and then follow the actions for further instants of HPLMN timer expiry.

However, on loss of coverage of the selected CSG cell, the UE 100 performs the actions based on the stored duplicate of the PLMN selection mode, stored EPLMN list, stored duplicate value of the RPLMN as described earlier. The various actions, acts, blocks, steps, and the like in method 500 may be performed in the order presented, in a different order or simultaneously. Further, in some embodiments, some actions, acts, blocks, steps, and the like may be omitted, added, modified, skipped, and the like without departing from the scope of the invention.

FIG. 6 illustrates an example sequence diagram for scenario 1 when registration attempt of the UE on the selected CSG cell associated with the different PLMN than the RPLMN of the UE is unsuccessful in the manual CSG selection mode, according to embodiments as disclosed herein. As depicted in the sequence diagram, the UE 100 is camped on PLMN 101*a* (RPLMN of the UE 100) in automatic PLMN selection mode. A user 600 Initiates (601) manual CSG selection mode. The UE 100 scans and displays (602) available CSG cells to the user 600. As depicted in the FIG. 1 the UE 100 receives coverage from multiple CSG cells including the CSG cell 102*a* associated with RPLMN of the UE 100, the CSG cells 102*b*, 102*d*, 102*c* and 102*e* respectively associated with the PLMNs different than the RPLMN of the UE 100. The user 600 selects (603) CSG 102*b* associated with PLMN 102*b*, where PLMN 102*b* is different than the RPLMN of the UE 100. Before attempting for registration on the selected CSG cell the UE 100 stores PLMN 101*a* as the duplicate value of RPLMN, duplicate PLMN selection mode as automatic (auto) and the EPLMN list provided to the UE 100. Thereafter, once the UE 100 initiates CSG selection procedure, the current PLMN selection mode of the UE 100 is set to manual because the CSG selection mode is manual and the PLMN associated with the selected CSG cell is not the RPLMN of the UE 100. Once the UE 100 successfully registers on the selected CSG 102*b*, the UE 100 displays (604) the CSG selection successful indication to the user 600. The UE 100 detect whether the CSG ID of the CSG 102*b* is in either of the OCSG list and the ACSG list. The UE 100 detects the CSG ID in the OCSG list and does not update the ACSG list with the CSG ID to avoid duplication of the entry.

Further, when still within the coverage of the CSG cell 102*b*, the user 600 initiates (605) the manual CSG selection mode and in response the UE 100 initiates scan to detect the available CSG cells. The UE 100 displays (606) available CSG cells and the user 600 selects (607) the CSG cell 102*c* associated with PLMN 101*c*. Before attempting registration on the CSG cell 102*c*, the UE 100, unlike existing method that stores the current PLMN selection mode, the UE 100 stores the PLMN selection mode corresponding to the stored duplicate value of the RPLMN. Thus, in this scenario the UE 100 stores the duplicate value of RPLMN as PLMN 101*a*, duplicate PLMN selection mode associated with the RPLMN (automatic in this scenario 1) and sets current PLMN selection mode to manual. On successful registration (608) on CSG cell 102*c*, the UE 100 detects that the CSG ID of the CSG cell 102*c* is not present in either the OCSG list or the ACSG list. Further, the UE 100 updates the ACSG list by adding CSG ID of CSG cell 102*c* to ACSG list.

Further, whenever the UE 100 moves out of coverage of CSG cell 102*c*, the UE 100 automatically attempts recovery to normal service on RPLMN using the stored duplicate value of RPLMN and the stored duplicate PLMN selection mode (auto) which supports auto recovery to normal service.

FIG. 7 illustrates the example sequence diagram for scenario 2 when the UE, attached to the selected CSG cell associated with the different PLMN than the RPLMN of the UE, suffers loss of coverage of the selected CSG cell when the UE is in the manual CSG selection mode, according to embodiments as disclosed herein. As depicted in the sequence diagram, the UE 100 is attached on PLMN 101*a* in manual PLMN selection mode where, PLMN 101*b* is EPLMN present in the EPLMN list of the UE 100. The user 600 initiates (701) the manual CSG selection mode and in response the UE 100 initiates scan to detect the available CSG cells. The UE 100 displays (702) available CSG cells and the user 600 selects (703) CSG cell 102*e* associated with PLMN 102*c*. Before attempting registration on the CSG cell 102*e*, the UE 100 stores the PLMN selection mode corresponding to the stored duplicate value of the RPLMN. Thus, in this scenario 2 the UE 100 stores the duplicate value of RPLMN as PLMN 101*a*, duplicate PLMN selection mode associated with the RPLMN (manual in this scenario) and sets current PLMN selection mode to manual.

If the UE 100 receives a CSG selection unsuccessful message from the selected CSG cell 102*e* that includes attach reject such as reject cause #35, the UE 100 displays (704) available PLMNs capable of providing normal service. Unlike existing method where the UE 100 deletes the EPLMN list in the UE 100 on receiving attach reject message such as reject cause #35 the method enables storing the EPLMN list along with the storing of duplicate value of RPLMN and duplicate of PLMN selection mode during attempt of registration on the selected CSG cell in the manual CSG selection mode.

An example situation of the UE 100 in FIG. 1 can be a situation whenever the UE 100 is in a geographical location where it suffers loss of coverage of CSG 102*e* associated with PLMN 102*c* as well as loss of coverage of PLMN 101*a* (RPLMN) but is in coverage area of PLMN 102*b* (EPLMN) the UE 100 can allow the user to select the available EPLMN (PLMN 102*b*) to recover (706) to normal service. Thus even after receiving attach reject with reject cause such as cause #35 message, the method enables the UE 100 to recover to normal service on the EPLMN during manual PLMN selection mode with help of the stored EPLMN list.

FIG. 8 illustrates the example sequence diagram for scenario 3 when the UE attached to the selected CSG cell in the manual CSG selection mode receives request to change current PLMN selection mode to the automatic PLMN selection mode, according to embodiments as disclosed herein. As depicted in the sequence diagram, the UE 100 is attached on PLMN 101*a* in the automatic PLMN selection mode and PLMN 101*a* is not the HPLMN of the UE 100. The user 600 initiates (801) the manual CSG selection mode (605) and in response the UE 100 initiates scan to detect the available CSG cells. The UE 100 displays (802) available CSG cells and the user 600 selects (803) the CSG cell 102*a* associated with its RPLMN (PLMN 101*a*).

As the UE 100 is out of coverage of the HPLMN, the HPLMN timer is initiated by the UE 100. On occurrence of first instant of HPLMN timer expiry the UE 100 displays (804) options for PLMN selection. The displayed choices for the user 600 include but are not limited to continue receiving services from the PLMN associated with the selected CSG (RPLMN) or switching to the HPLMN of the UE 100. For any further HPLMN timer expiry, the previous conducted actions are repeated without need for user intervention.

FIG. 9 illustrates the example sequence diagram for scenario 4 for handling expiry of a Home PLMN (HPLMN) timer in the manual CSG selection mode, when UE is attached to the selected CSG cell associated with RPLMN of the UE which is different from the HPLMN of the UE, according to embodiments as disclosed herein. As depicted in the sequence diagram, the UE 100 is attached on PLMN 101*a* in manual PLMN selection mode. The user 600 initiates (901) the manual CSG selection mode and in response the UE 100 initiates scan to detect the available CSG cells. The UE 100 displays (902) available CSG cells and the user 600 selects (903) CSG cell 102*e* associated with PLMN 102*c*. Before attempting registration on the CSG cell 102*e*, the UE 100 stores the duplicate value of RPLMN as PLMN 101*a*, the duplicate PLMN selection mode as auto, sets the current PLMN selection mode to manual. Further, the user 600 changes (904) the current PLMN selection mode of the UE 100 to automatic.

In response to the PLMN selection mode change initiation, the UE 100 deletes stored duplicate values of RPLMN and stored duplicate PLMN selection mode. The UE 100 displays (905) multiple auto PLMN selection procedure options and allows the user to select (906) the auto PLMN selection procedure option. Thereafter, the UE 100 performs auto PLMN selection based on the user selected option and further resets CSG selection mode to auto.

FIG. 10 illustrates the computing environment implementing the method and system for handling UE behavior in manual CSG selection mode, according to embodiments as disclosed herein. As depicted in the figure, the computing environment 1000 comprises at least one processing unit 1001 that is equipped with a control unit 1002 and an Arithmetic Logic Unit (ALU) 1003, a memory 1004, a storage unit 1005, a plurality of networking devices 1006 and a plurality Input output (I/O) devices 1007. The processing unit 1001 is responsible for processing the instructions of the algorithm. The processing unit 1001 receives commands from the control unit 1002 in order to perform its processing. Further, any logical and arithmetic operations involved in the execution of the instructions are computed with the help of the ALU 1003.

The algorithm comprising of instructions and codes required for the implementation are stored in either the memory unit 1004 or the storage 1005 or both. At the time of execution, the instructions may be fetched from the corresponding memory 1004 and/or storage 1005, and executed by the processing unit 1001.

In case of any hardware implementations various networking devices 1007 or external I/O devices 1006 may be connected to the computing environment to support the implementation through the networking unit and the I/O device unit. The embodiments disclosed herein can be implemented through at least one software program running on at least one hardware device and performing network management functions to control the network elements.

The embodiments disclosed herein can be implemented through at least one software program running on at least one hardware device and performing network management functions to control the elements. The elements shown in FIGS. 1, 2, 6, 7, 8 and 9 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for operating a user equipment (UE) in a manual closed subscriber group (CSG) selection mode in a wireless network, the method comprising:
    receiving a first user input for manually selecting a CSG cell associated with a first public land mobile network (PLMN) different from a registered PLMN (RPLMN) of the UE;
    camping on the CSG cell associated with the first PLMN, after storing a PLMN selection mode corresponding to a duplicate value of the RPLMN in response to the selection;
    receiving a second user input for manually selecting a CSG cell associated with a second PLMN different from the first PLMN during the UE camping on the CSG cell associated with the first PLMN in a manual PLMN selection mode; and
    camping on the RPLMN or equivalent PLMN (EPLMN) based on the stored PLMN selection mode corresponding to the duplicate value of the RPLMN in response to a failure of a registration attempt to the selected CSG cell associated with the second PLMN,
    wherein the PLMN selection mode corresponding to the duplicate value of the RPLMN is an automatic PLMN selection mode.

2. The method of claim 1, further comprising:
    updating an allowed CSG (ACSG) list with a CSG identifier (CSG ID) of the selected CSG cell associated with the second PLMN after determining that the CSG ID and the second PLMN is not present in a operator CSG (OCSG) list and the ACSG list of the UE in response to a success of the registration attempt to the selected CSG cell associated with the second PLMN.

3. The method of claim 1, further comprising:
    camping on the RPLMN or the EPLMN based on the stored PLMN selection mode in response to a loss of a coverage of the selected CSG cell associated with the first PLMN or the second PLMN.

4. A user equipment (UE) supporting a manual closed subscriber group (CSG) selection in a wireless network, the UE comprising:
    at least one processor configured to:
        receive a first user input for manually selecting a CSG cell associated with a first public land mobile network (PLMN) different from a registered PLMN (RPLMN) of the UE,
        camp on the CSG cell associated with the first PLMN, after storing a PLMN selection mode corresponding to a duplicate value of the RPLMN in response to the selection,
        receive a second user input for manually selecting a CSG cell CSG cell associated with a second PLMN different from the first PLMN during the UE camping on the CSG cell associated with the first PLMN in a manual PLMN selection mode, and
        camp on the RPLMN or equivalent PLMN (EPLMN) based on the stored PLMN selection mode corresponding to the duplicate value of the RPLMN in response to a failure of a registration attempt to the selected CSG cell associated with the second PLMN,
    wherein the PLMN selection mode corresponding to the duplicate value of the RPLMN is an automatic PLMN selection mode.

5. The UE of claim 4, wherein the at least one processor is further configured to:
    store at least one of an EPLMN list including the EPLMN or the duplicate value of the RPLMN, and
    camp on the RPLMN or the EPLMN based on at least one of the stored EPLMN list or the duplicate value of the RPLMN.

6. The UE of claim 4, wherein the at least one processor is further configured to:
    update an allowed CSG (ACSG) list with a CSG identifier (CSG ID) of the selected CSG cell associated with the second PLMN after determining that the CSG ID and the second PLMN is not present in a operator CSG (OCSG) list and the ACSG list of the UE in response to a success of the registration attempt to the selected CSG cell associated with the second PLMN.

7. The method of claim 1, further comprising:
    storing at least one of an EPLMN list including the EPLMN or the duplicate value of the RPLMN,
    wherein the camping on of the RPLMN or the EPLMN comprises camping on the RPLMN or the EPLMN based on at least one of the stored EPLMN list or the duplicate value of the RPLMN.

8. The UE of claim 4, wherein the at least one processor is further configured to:
    camp on the RPLMN or the EPLMN based on the stored PLMN selection mode in response to a loss of a coverage of the selected CSG cell associated with the first PLMN or the second PLMN.

* * * * *